(12) United States Patent
Kumar et al.

(10) Patent No.: US 10,958,588 B2
(45) Date of Patent: Mar. 23, 2021

(54) RELIABILITY PROCESSING OF REMOTE DIRECT MEMORY ACCESS

(71) Applicant: International Business Machines Corporation, Armonk, NY (US)

(72) Inventors: Sameer Kumar, White Plains, NY (US); Philip Heidelberger, Cortlandt Manor, NY (US); Yutaka Sugawara, Eastchester, NY (US); Dong Chen, Scarsdale, NY (US); Robert M. Senger, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/888,228

(22) Filed: Feb. 5, 2018

(65) Prior Publication Data
US 2019/0245799 A1  Aug. 8, 2019

(51) Int. Cl.
*H04L 12/801* (2013.01)
*G06F 15/173* (2006.01)
*H04L 12/861* (2013.01)

(52) U.S. Cl.
CPC ........ *H04L 47/34* (2013.01); *G06F 15/17331* (2013.01); *H04L 49/90* (2013.01)

(58) Field of Classification Search
CPC .... H04L 47/34; H04L 49/90; G06F 15/17331
See application file for complete search history.

(56) References Cited

U.S. PATENT DOCUMENTS

| 5,784,699 | A | 7/1998 | McMahon et al. |
| 6,292,795 | B1 | 9/2001 | Peters et al. |
| 6,574,665 | B1 | 6/2003 | Khotimsky |
| 6,640,290 | B1 | 10/2003 | Forin et al. |
| 6,886,162 | B1 | 4/2005 | McKenney |
| 7,299,266 | B2 * | 11/2007 | Boyd .................... G06F 12/145 709/213 |

(Continued)

OTHER PUBLICATIONS

Jiang et al. "High performance MPI-2 one-sided communication over InfiniBand." Cluster Computing and the Grid, 2004. CCGrid 2004. IEEE International Symposium on. IEEE, Apr. 19-22, 2004, pp. 1-9.

(Continued)

*Primary Examiner* — Thomas J Dailey
(74) *Attorney, Agent, or Firm* — Scully, Scott, Murphy & Presser, P.C.; Daniel P. Morris

(57) ABSTRACT

Methods and systems for monitoring remote transmissions of messages among a plurality of nodes are described. A processing element in a first node may allocate a sequence number to a request to read and/or update data in a second node. The processing element may be different from main processors of the first node. The processing element may send the message and the sequence number to the second node. The processing element may modify a status of the sequence number to an active state, indicating a transmission of the message is pending. The processing element may, in response to a response from the second node, modify the status of the sequence number to an inactive state, indicating a completed transmission of the message. The processing element may, in response to no response from the second node within a time period, resend the message and the sequence number to the second node.

20 Claims, 9 Drawing Sheets

(56) References Cited

U.S. PATENT DOCUMENTS

| | | |
|---|---|---|
| 7,308,607 B2 | 12/2007 | Reinhardt et al. |
| 7,430,615 B2 * | 9/2008 | Blackmore ......... H04L 67/1097 709/214 |
| 7,580,406 B2 * | 8/2009 | Shah ................... H04L 67/1097 370/389 |
| 7,912,988 B2 | 3/2011 | Boyd et al. |
| 9,164,904 B2 | 10/2015 | Lim et al. |
| 9,930,044 B2 | 3/2018 | Noronha et al. |
| 10,509,764 B1 | 12/2019 | Izenberg et al. |
| 2008/0162663 A1 * | 7/2008 | Schlansker ........... G06F 13/385 709/217 |

OTHER PUBLICATIONS

Pelley, "Database and System Design for Emerging Storage Technologies." Diss. University of Michigan, 2014.

* cited by examiner

```
1  #define N_QUEUE_ELEMENTS  4096  // number of free slots
2  #define N_QUEUE_SECTIONS  64    // number of sections in free slot queue
3
4  // number of elements in each of these sections
5  #define N_ELEMENTS_IN_SECTION (N_QUEUE_ELEMENTS/N_QUEUE_SECTIONS)
6
7  uint64_t n_allocated = 0; // number of allocated elements
8
9  // upper bound of n_allocated (i.e. indicates allocatable count)
10 uint64_t n_alloc_bound = N_QUEUE_ELEMENTS;
11 // number of elements allocated for storing free elements
12 // (i.e. number of elements that started being freed (not necessarily done)
13 uint64_t n_freed = 0;
14 // the array of queue elements, each element stores free slot ID
15 uint16_t free_slot_queue[N_QUEUE_ELEMENTS] =
16     { 0, 1, 2, 3, ..., N_QUEUE_ELEMENTS-1 };
17 // number of elements in each section that have been freed
18 // actually also incremented when the previous section is done
19 // to make sure that all the preceding sections are done
20 // the first element is initialized by 1 since "preceding" section is done
21 uint64_t n_freed_in_section[N_QUEUE_SECTIONS] = { 1, 0, 0, 0, 0, 0, ... };
```

INSTRUCTIONS 601

```
1  int allocate_slot()
2  {
3    // get a sequence number for allocation
4    uint64_t allocated_count = fetch_inc_bounded(&n_allocated, &n_alloc_bound);
5    // fails if reached the upper bound
6    if (allocated_count == INC_FAILED) {
7      return NO_AVAILABLE_SPACE;
8    }
9    // calculate the position in the queue in which the free slot ID is stored
10   uint64_t queue_index = allocated_count % N_QUEUE_ELEMENTS;
11   // get the slot ID and return
12   return free_slot_queue[queue_index];
13 }
```

INSTRUCTIONS 602

FIG. 6

```
1  void free_slot(uint16_t seq_no)
2  {
3     // get a sequence number for freeing
4     uint64_t freed_count = fetch_inc(&n_freed);
5     // calculate the position in the queue to store freed slot ID
6     uint64_t queue_index = freed_count % N_QUEUE_ELEMENTS;
7     // store the free slot ID
8     free_slot_queue[queue_index] = seq_no;
9
10    // number of sections that have been freed and got available for allocation
11    uint64_t n_freed_sections = freed_count / N_ELEMENTS_IN_SECTION;
12
13    // update the section counters until a non-ready section is reached
14    for(;;) {
15
16       // the section ID currently looking at
17       uint64_t section_id = n_freed_sections % N_QUEUE_SECTIONS;
18       // number of times the queue has been lapped
19       uint64_t n_queue_lapped = n_freed_sections / N_QUEUE_SECTIONS;
20       // do fetch and inc to find total number of freed entries
21       // plus contributions from the preceding section
22       uint64_t freed_count_in_section = fetch_inc(&n_freed_in_section[section_id]);
23
24       // calculate the "goal" count which indicates this all the elements
25       // in this section were freed and preceding sections are ready
26       uint64_t freed_count_goal = (N_ELEMENTS_IN_SECTION + 1) * n_queue_lapped - 1;
27
28       // if they don't match, this section is not totally free yet
29       if (freed_count_in_section != freed_count_goal) break; // not yet ready
30
31       // this section is totally free. Update n_alloc_bound and check the next section
32       n_freed_sections ++; // move to the next section
33       n_alloc_bound = (n_freed_sections * N_ELEMENTS_IN_SECTION) + N_QUEUE_ELEMENTS;
34    }
35 }
```

INSTRUCTIONS 701

FIG. 7

RELIABILITY PROCESSING OF REMOTE DIRECT MEMORY ACCESS

This invention was made with government support under Contract No. B554331 awarded by the Department of Energy. The government has certain rights to this invention.

FIELD

The present application relates generally to computers, and computer applications, and more particularly to computer-implemented methods and systems in reliability processing of remote direct memory access.

BACKGROUND

In a network, packets may be transmitted among a plurality of computing nodes and in the midst of the transmissions, packets may be dropped. A reliability of the network may be affected by a number of packets dropped during the transmissions. An increase in a number of successful transmissions may increase the reliability of the network.

SUMMARY

In some examples, methods for monitoring remote transmissions of messages among a plurality of nodes are generally described. The methods may include receiving, by a processing element in a first node, a request to send a message to perform an access operation on data stored in a second node. The first node may include one or more main processors different from the processing element. The methods may further include allocating, by the processing element, a sequence number to the message. The methods may further include sending, by the processing element, the message and the sequence number to a processing element of the second node. The methods may further include modifying, by the processing element, a status of the sequence number to an active state. The active state of the sequence number may indicate that a transmission of the message is pending. The methods may further include identifying, by the processing element, a presence or an absence of a response from the second node within a period of time. The methods may further include in response to a presence of the response from the second node within the period of time, modifying, by the processing element, the status of the sequence number to an inactive state. The inactive state of the sequence number may indicate that a transmission of the message is completed. The methods may further include in response to an absence of the response from the second node within the period of time, resending, by the processing element, the message and the sequence number to the processing element of the second node.

In some examples, systems effective to monitor remote transmissions of messages among a plurality of nodes are generally described. The systems may include a first node including at least a first main processor, a first memory, and a first processing element different from the first main processor. The systems may further include a second node including at least a second main processor, a second memory, and a second processing element different from the second main processor. The first processing element may be configured to receive a request to send a message to perform an access operation on data stored in the second memory of the second node. The first processing element may be further configured to allocate a sequence number to the message. The first processing element may be further configured to send the message and the sequence number to the second processing element of the second node. The first processing element may be further configured to modify a status of the sequence number to an active state. The active state of the sequence number may indicate that a transmission of the message is pending. The first processing element may be further configured to identify a presence or an absence of a response from the second processing element within a period of time. The first processing element may be further configured to, in response to a presence of the response from the second processing element within the period of time, modify the status of the sequence number to an inactive state. The inactive state of the sequence number may indicate that a transmission of the message is completed. The first processing element may be further configured to, in response to an absence of the response from the second node within the period of time, resend the message and the sequence number to the second processing element of the second node.

In some examples, computer program products for monitoring remote transmissions of messages among a plurality of nodes are generally described. The computer program products may include a computer readable storage medium having program instructions embodied therewith. The program instructions may be executable by a processing element of a device to cause the device to receive a request to send a message to perform an access operation on data stored in a destination node. The device may include one or more main processors different from the processing element. The program instructions may be further executable by a processing element of a device to cause the device to allocate a sequence number to the message. The program instructions may be further executable by a processing element of a device to cause the device to send the message and the sequence number to a processing element of the destination node. The program instructions may be further executable by a processing element of a device to cause the device to modify a status of the sequence number to an active state. The active state of the sequence number may indicate that a transmission of the message is pending. The program instructions may be further executable by a processing element of a device to cause the device to identify a presence or an absence of a response from the destination node within a period of time. The program instructions may be further executable by a processing element of a device to cause the device to, in response to a presence of the response from the destination node within the period of time, modify the status of the sequence number to an inactive state. The inactive state of the sequence number may indicate that a transmission of the message is completed. The program instructions may be further executable by a processing element of a device to cause the device to, in response to an absence of the response from the destination node within the period of time, resend the message and the sequence number to the processing element of the destination node.

BRIEF DESCRIPTION OF THE DRAWINGS

FIG. 6 illustrates example sets of instructions that may be executed to implement the example system of FIG. 1.

FIG. 7 illustrates an example set of instructions that may be executed to implement the example system of FIG. 1.

DETAILED DESCRIPTION

Briefly stated, methods and systems for monitoring remote transmissions of messages among a plurality of nodes are described. A processing element in a first node may allocate a sequence number to a request to read and/or update data in a second node. The processing element may be different from a main processor of the first node. The processing element may send the message and the sequence number to the second node. The processing element may modify a status of the sequence number to an active state, indicating a transmission of the message is pending. The processing element may, in response to a response from the second node, modify the status of the sequence number to an inactive state, indicating a completed transmission of the message. The processing element may, in response to no response from the second node within a period of time, resend the message and the sequence number to the second node.

Figure 1:
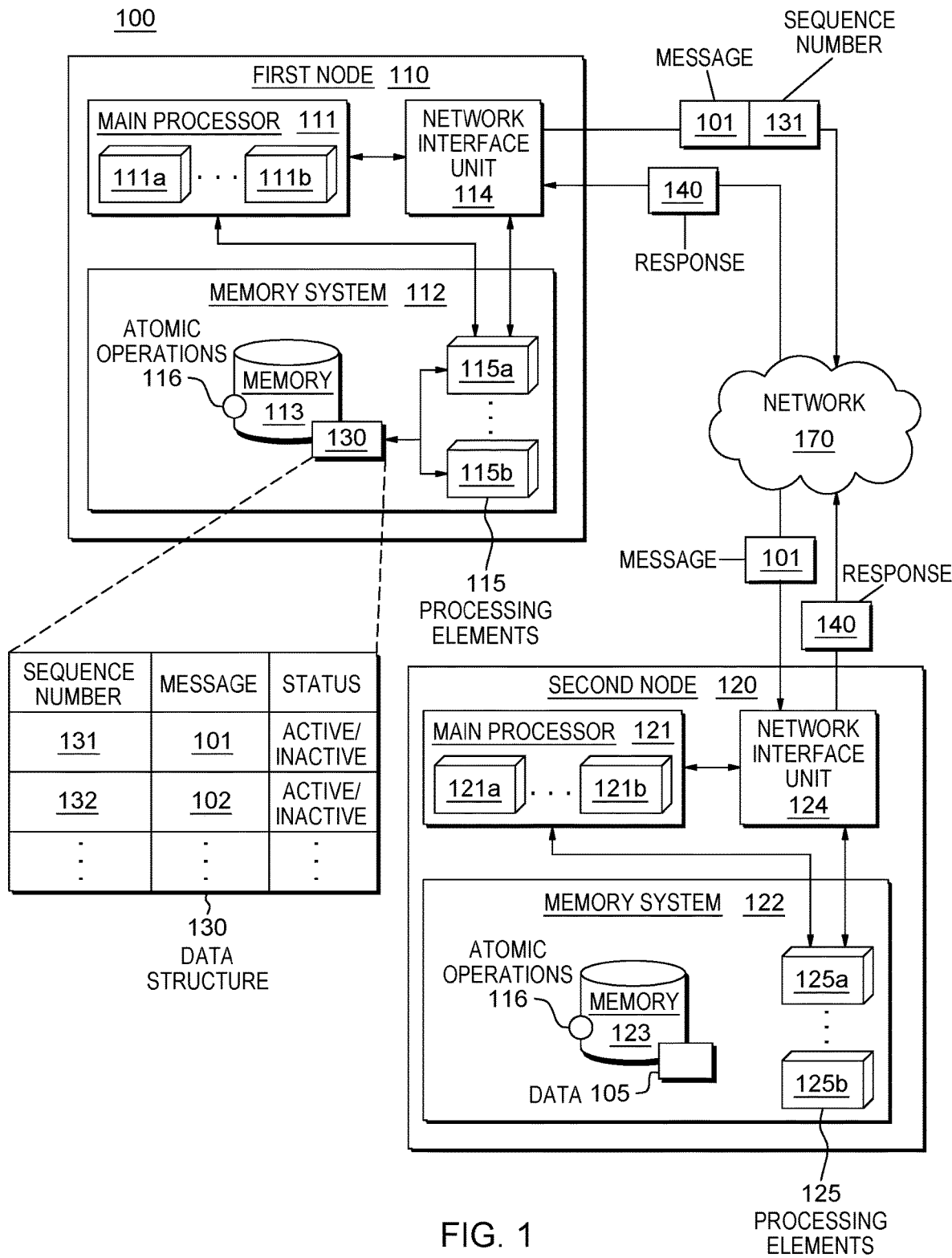
FIG. 1 illustrates an example computer system that can be utilized to implement reliability processing of remote direct memory access.

FIG. 1 illustrates an example computer system 100 that can be utilized to implement reliability processing of remote direct memory access, arranged in accordance with at least some embodiments described herein. In some examples, system 100 may include a plurality of networked computing nodes, where each node may include one or more processing elements different from a main processor of the corresponding node. In some examples, each node may be a tile among a multi-core processor, such one or more processing elements may be integrated on a corresponding core within a tile. In some examples, the one or more processing elements may be embedded within or located closely coupled to a memory system of a corresponding node. The location of the processing elements being close to the memory system may push execution of operations to the memory where the data being operated on is stored, in contrast to systems that pull data from memory and utilizes a main processor to execute the operations. As such, messages may flow among nodes within the network and may initiate procedures or instructions that run in the memory system of the nodes without involvement by a main processor of the nodes. Also, by placing processing elements close to memory systems, performances of applications, such as graph applications, that may require massive number of small fine-grained accesses to the memory, may be improved.

Further, in embodiments where data is transmitted across a local network within a device, the transmission may increase bandwidth and power usage as compared to remote transmission of messages using processing elements embedded within memory systems. As will be described in more detail below, reliability processing (e.g., including monitoring whether messages are transmitted successfully) may be offloaded to the processing elements among the nodes within the network, such that overhead for reliability processing experienced by main processor of the nodes may be reduced.

In examples where processing elements 115 are integrated in a processor core, processing elements 115 may have access to the main memory (e.g., memory 113) via the system bus, and main cores of first node 110 may read/write control registers of processing elements 115 via system bus. In examples where processing elements 115 are integrated on the same chip as the core (e.g., on an I/O bus bridge), processing elements 115 may have access to the main memory via the system bus, and the main cores can read/write control registers of processing elements 115 as well.

In an example shown in FIG. 1, system 100 may be a computer system and may include a plurality of computing nodes, such as a first node 110 and a second node 120. In some examples, first node 110 and second node 120 may each be a part of a respective computer device. First node 110 and second node 120 may be configured to be in communication through a network 170. In examples where first node 110 and second node 120 are each part of a respective computer device, network 170 may be a wide area network (WAN), a local area network (LAN), a global network (e.g. Internet), a virtual private network (VPN), and an intranet. Possible Interconnect mechanisms for Network 170 include, but are not limited to, InfiniBand, Ethernet, or proprietary interconnect architecture for parallel computing systems, such as Blue Gene/Q Interconnect Fabric. Embodiments of the system may be implemented on a network of any topology, including but not limited to, a torus, fat tree, or all-connect. Network 170 may be implemented using a wireless network (e.g., cellular, satellite, etc.) or any kind of physical network implementation. In some examples, nodes 110, 120 may be configured to be in communication through a plurality of networks (e.g., intranet and Internet). In some examples, nodes 110, 120 may be connected to each other directly, instead of through network 170.

In some examples, first node 110 and second node 120 may be parts of a same computer device. In examples where first node 110 and second node 120 are parts of a same computer device, network 170 may be a local network within the computing device. For example, a local network may include data paths local to a particular node between main processor(s), processing element(s) and memory systems of the particular node. In some examples, a local network may include an interconnect network as part of the local data path. In some examples, a local interconnect network may be a high bandwidth interconnect within a node to provide data movement between the network interface, processor, processing elements and memory devices. In some examples, the local interconnect network may be a coupling device, such as a crossbar switch, configured to connect any processing element to any memory vault (i.e. stack of memory devices) in a memory system, provided the processing element and memory vault are coupled to the local interconnect network.

First node 110 may include one or more main processors 111 (including 111a, 111b, etc.), a memory system 112, and/or a network interface unit 114. Main processor 111 may be configured to be in communication with memory system 112 and network interface unit 114. Network interface unit 114 may be configured to be in communication with main processor 111 and memory system 112. Memory system 112 may include one or more memories, such as a memory 113. In some examples, memory system 112 may also include caches, on-chip system buses, off-chip system buses, and/or I/O buses such as PCIe. In an example embodiment shown in FIG. 1, memory system 112 may include one or more processing elements 115 (including 115a, 115b, etc.). Processing elements 115 may be configured to be in communication with memory 113. In another embodiment, processing elements 115 may be integrated in main processor 111, and may be assigned to execute operations different from operations assigned to be executed by main processor 111.

Second node 120 may include one or more main processors 121 (including 121a, 121b, etc.), a memory system 122, and/or a network interface unit 124. Main processor 121 may be configured to be in communication with memory system 122 and network interface unit 124. Network interface unit 124 may be configured to be in communication with main processor 121 and memory system 122. Memory system 122 may include one or more memories, such as a memory 123. In some examples, memory system 112 may also include caches, on-chip system buses, off-chip system buses, and/or I/O buses such as PCIe. In an example embodiment shown in FIG. 1, memory system 122 may include one or more processing elements 125 (including 125a, 125b, etc.). Processing elements 125 may be configured to be in communication with memory 123. In another embodiment, processing elements 125 may be integrated in main processor 121, and may be assigned to execute operations different from operations assigned to be executed by main processor 121.

In some examples, processing elements 115, 125 may be programmable engines, comprising an instruction buffer and an instruction unit, branching capability and instruction decode, a mixture of vector, scalar, and mask register files, a plurality of load/store units for the movement of data between memory and the register files, and a plurality of execution units for the arithmetic and logical processing of various data types. Embodiments of processing elements 115, 125 being in respective memory systems may also have the ability to read or to write operands in any part of a respective local memory through a local interconnect network. Each processing element may access multiple memory devices using a local interconnect network. Processing elements 115, 125 may be located in an arbitrary type of memory, such as cache, random access memory or other memory types, or in logic tightly coupled to the memory, such as a memory controller or remote direct memory access (RDMA) device.

In some examples, main processors 111, 121 and processing elements 115, 125 may each be hardware components or hardware modules of system 100. Processing elements 115, 125 may be a hardware processor different from main processors 111, 121, respectively. In some examples, main processors 111, 121 may each be a central processing unit (CPU) of nodes 110, 120, respectively. Processing elements 115, 125 may be implemented with integrated circuits.

Memory 113 and memory 123 may each be configured to store instructions executable by first node 110 and second node 120 to implement system 100. For example, in one embodiment, memory 113 may store a set of monitor instructions that may include atomic memory update operations ("atomic operations") 116. Memory 113 may be configured to support atomic operations 116 that may include one or more set of primitives to update the memory contents atomically without being interrupted by another memory access requests. By using atomic operations 116, multiple main processors and/or processing elements may update in-memory data structure concurrently without using mutex locks (mutual exclusive locks). As such, relatively high performance in parallel computing systems may be achieved. Atomic operations 116 may include instructions relating to bit vector operations, hash table operations, hash functions, queue operations, and various data structure techniques, etc. In some examples, atomic operations 116 may be related to atomic memory operations that may be performed by processing elements 115, 125, such as fetch-and-OR, fetch-and-AND, fetch-and-INCREMENT, etc., to implement system 100. In some examples, a data structure 130, associated with a database indicating indices and status of messages being transmitted among nodes of system 100, may be stored in a private area accessible to processing elements of a particular node. For example, memory 113, accessible to processing elements 115 of node 110, may be further configured to store data structure 130. Data structure 130 may be constructed so that multiple processing elements 115 may concurrently read and update data structure 130 using atomic operations 116, and without using mutex locks. As will be described in more detail below, processing elements 115 may be configured to execute atomic operations 116 to manage data structure 130 and/or to modify contents of data structure 130 based on transmissions of messages among nodes within system 100. In some examples, each node among system 100 may store respective data structure associated with messages being transmitted from the corresponding node. For example, memory 123 of second node 120 may stored another data structure relating to messages being transmitted from second node 120.

In an example shown in FIG. 1, main processor 111 may execute an application (e.g., a user program), where execution of the application may require access of a piece of data 105 stored in memory 123 of second node 120. Main processor 111 may issue a request to at least one of processing elements 115 within memory system 112 to send a message 101 to second node 120, where message 101 may be an access request, such as a remote direct memory access (RDMA) put request. In some examples, access requests may include requests to perform access operations such as read, write, update, etc. In the example shown in FIG. 1, message 101 may indicate a request to read and/or update data 105 in memory 123 of second node 120. Processing element 115a may receive a request to send message 101 and, in response, may execute one or more atomic operations 116 to allocate an index, or a sequence number 131, from data structure 130 to message 101 (the allocation of sequence numbers will be described in more detail below). Each sequence number among data structure 130 may be uniquely allocated to a message. For example, as shown in data structure 130, sequence number 131 may be allocated to message 101, and a different sequence number 132 may be allocated to another message 102. In some instances, data structure 130 may include sequence numbers that have yet to be assigned to any message. Processing element 115a may append sequence number 131 to message 101. In some examples, message 101 may further include information such as identification of data 105, first node 110, second node 120, a request for a response, etc. Processing element 115a may send message 101 and sequence number 131 to processing elements 125 of second node 120 through network interface unit 114 and/or network 170.

Upon allocating the sequence number 131 to message 101, processing element 115a may update a status of sequence number 131 in data structure 130 to an active state. Allocation of a sequence number 131 and update to an active state may be performed, by processing element 115a, in an atomic manner with respect to the other processing elements (e.g., 115*b*), so that a sequence number is not incorrectly allocated to multiple messages processed by different processing elements. The active state of a sequence number may indicate that transmission of a corresponding message is pending, or not yet completed. In some examples, modification of data structure 130 may be performed by a processing element different from the processing element that sent out message 101. For example, processing element 115*b* may modify a status of sequence number 131 in data structure 130 upon a transmission of message 101 performed by processing element 115*a*.

Processing elements 115 may wait for a response from processing elements 125 upon sending message 101 and sequence number 131. Processing elements 115 may detect for a presence or an absence of a response from processing elements 125 within a period of time. In response to no response from processing elements 125 within the period of time, processing elements 115 may resend message 101 and sequence number 131. An absence of a response by a destination node may indicate that a message was not successfully transmitted and, thus, may be necessary to resend the message. Further, in response to no response from processing elements 125, processing elements 115 may identify all messages associated with an active state (indicated by data structure 130) and may resend the identified messages to respective destination nodes. By utilizing processing elements 115 to wait for responses and react to an absence of response, monitoring of attempts to transmit messages among nodes may bypass main processor 111 of first node 110 and may alleviate the workload of main processor 111.

In some examples (e.g., a successful transmission), processing elements 125 may receive message 101 and sequence number 131 through network 170 and/or network interface unit 124. When message 101 and sequence number 131 is received at processing elements 125 of second node 120 successfully, processing elements 125 may generate a response 140. Response 140 may be an acknowledgement signal, an acknowledgement message, a packet, etc., that may include sequence number 131, and/or identifications of, one or more of, message 101, first node 110, second node 130, etc. In the example shown in FIG. 1, processing element 125*a* may generate response 140 and may send response 140 to processing elements 115 through network interface unit 124 and/or network 170.

Processing elements 115 (or any one of processing elements 115*a*) may receive response 140 and, in response, may analyze the data included in response 140 to identify data included in response 140. Processing element 115*a* may identify identifications of message 101 and/or sequence number 131. Identification of message 101 and sequence number 131 may indicate a successful and completed transmission of message 101. Processing element 115*a* may modify a status of sequence number 131 in data structure 130 to an inactive status. An inactive status of a sequence number may indicate that the sequence number is unused, and may be available to be allocated to another message subsequently.

Figure 2:
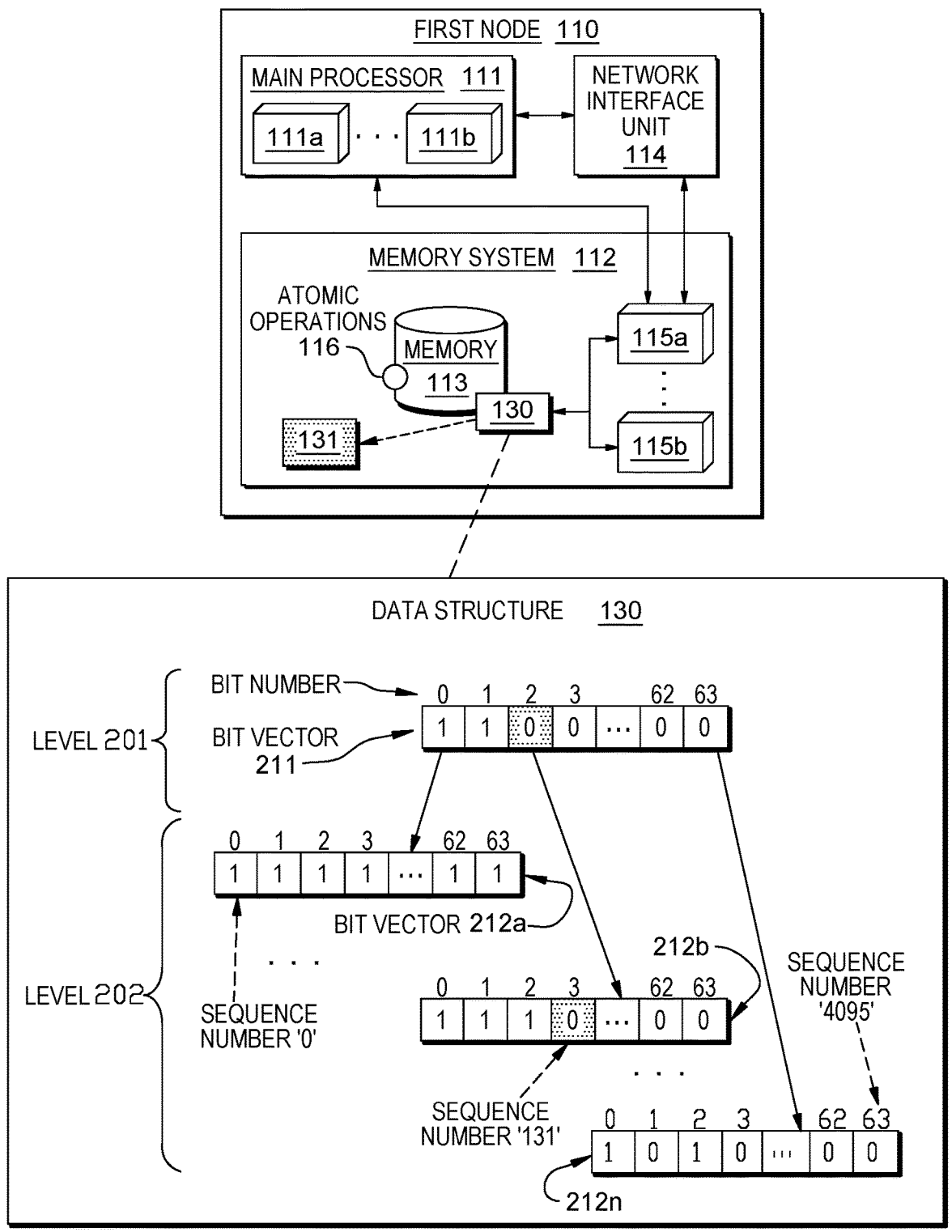
FIG. 2 illustrates the example system of FIG. 1 with additional details relating to reliability processing of remote direct memory access.

FIG. 2 illustrates the example system of FIG. 1 with additional details relating to reliability processing of remote direct memory access, arranged in accordance with at least some embodiments described herein. FIG. 2 is substantially similar to computer system 100 of FIG. 1, with additional details. Those components in FIG. 2 that are labeled identically to components of FIG. 1 will not be described again for the purposes of clarity.

In some examples, data structure 130 may be a multi-level parallel hash table and may represent sequence number status with a bitmap. In an example shown in FIG. 2, data structure 130 may include one or more layers, or levels, of bit vectors, where each bit vector may be of a same size. Data structure 130 may include at least a level 201 and a level 202. In some examples, data structure 130 may include more than two levels. Level 201 may include a bit vector 211, where bit vector 211 may include 64 bits, and where each bit may be a value of '0' or '1'. Level 202 may include a plurality of bit vectors 212 (including 212*a*, 212*b*, 212*n*, etc.), where each bit vector 212 may include 64 bits, and where each bit may be a value of '0' or '1'. The number of bit vectors among level 202 may be same as the number of bits included in bit vector 211. For example, since bit vector 211 includes 64 bits, level 202 may include 64 different bit vectors. Each bit vector among level 202 may correspond to, or may be mapped to, a bit among bit vector 211. For example, bit vector 212*a* may correspond to a bit number 0 among bit vector 211, bit vector 212*b* may correspond to a bit number 1 among bit vector 211, and bit vector 212*n* may correspond to a bit number 63 among bit vector 211.

In the example shown in FIG. 2, since bit vector 211 includes 64 bits, and level 202 includes 64 bit vectors, data structure 130 may include a total of 4096 sequence numbers (e.g., by performing a multiplication of 64×64). The sequence numbers may be ordered according to an order of bits among bit vector 211 and an order of bit vectors among level 202. For example, a first sequence number '0' may correspond to a first bit of bit vector 211 and a first bit of bit vector 212*a*, where bit vector 212*a* is a first bit vector among level 202. Similarly, a last sequence number '4095' may correspond to a last bit of bit vector 211 and a last bit of bit vector 212*n*, where bit vector 212*n* is a last bit vector among level 202. Each bit among bit vectors of level 202 may correspond to a sequence number. For example, bit number 0 of bit vector 212*a* may correspond to a sequence number '0', bit number 63 of bit vector 212*a* may correspond to a sequence number "63", bit number 3 of bit vector 212*b* may correspond to a sequence number "131", and bit number 63 of bit vector 212*n* may correspond to a sequence number "4095".

A value of each bit among bit vectors of levels 201, 202, may indicate a status of a sequence number. For example, a bit value of '0' among bits in level 202 may indicate an inactive status of a sequence number, or may indicate that the corresponding sequence number is available to be allocated to a message. A bit value of '1' among bits in level 202 may indicate an active status of a sequence number, or may indicate that the corresponding sequence number is allocated to a message that has been sent out from first node 110 and not yet acknowledged by a receiving node. A bit value of '0' among bits in level 201 may indicate that a corresponding bit vector in level 202 may include at least one inactive sequence number available for allocation. A bit value of '1' among bits in level 201 may indicate that all sequence numbers corresponding to a corresponding bit vector in level 202 may be active and unavailable for allocation.

In some examples, processing elements 115 may be configured to modify each bit among bit vectors in levels 201, 202. For example, processing elements 115 may execute an atomic operation 116 provided by the memory system; a bit-wise logical AND operation to clear a bit in a bit vector, and a bit-wise logical OR operation to set a bit in a bit vector. In another example, memory system 112 may provide a reservation mechanism using which processing elements 115 can read and update a bit vector atomically without being interrupted by another processing element.

In an example, in order to allocate a sequence number to a message, processing elements 115 may identify an inactive sequence number by performing a search among data structure 130. For example, processing element 115a may first search for a value '0' among bits of bit vector 211 in level 201. Processing element 115a may first identify that bit number 0 of bit vector 211 is of a value '1', which indicates that sequence numbers (0 to 63) among the associated bit vector 212a are active and unavailable for allocation. Subsequently, processing element 115a may identify that bit number 1 of bit vector 211 is of a value '1', which indicates that sequence numbers (64 to 127) among the associated bit vector are active and unavailable for allocation.

Subsequently, processing element 115a may identify that bit number 2 of bit vector 211 is of a value '0', which indicates that the associated bit vector 212b includes at least one sequence number that may be inactive and available for allocation. Processing element 115a may continue to search for a '0' in the associated bit vector 212b.

Processing element 115a may first identify that bit number 0 of bit vector 212b is of a value '1', which indicates that sequence number '128' is active and unavailable for allocation. Similarly, processing element 115a may determine that bit numbers 1 and 2 of bit vector 212b are of a value '1' and thus, sequence numbers '129' and '130' are active and unavailable for allocation. Processing element 115a may identify that bit number 3 of bit vector 212b is of a value '0', which indicates that sequence number 131 is inactive and is available for allocation. Processing element 115a may allocate the identified sequence number 131 to a message (e.g., message 101) that needs to be transmitted to another node in order to implement system 100.

Upon allocating sequence number 131 to a message, processing elements 115 may modify a status of sequence number 131 by modifying the value of bit number 3 in bit vector 212b from '0' to '1'.

Further, in response to receiving a response associated with sequence number 131 from a destination node (e.g., response 140 from second node 120 as shown in FIG. 1), processing elements 115 may modify a status of sequence number 131 by modifying the value of bit number 3 in bit vector 212b from '1' to '0'.

In some examples, each processing element 115 may have access to data structure 130. Processing elements 115 may be configured to retry a search for an available sequence number in response to access conflicts, such as when two or more processing elements 115 are performing a search simultaneously.

Figure 3:
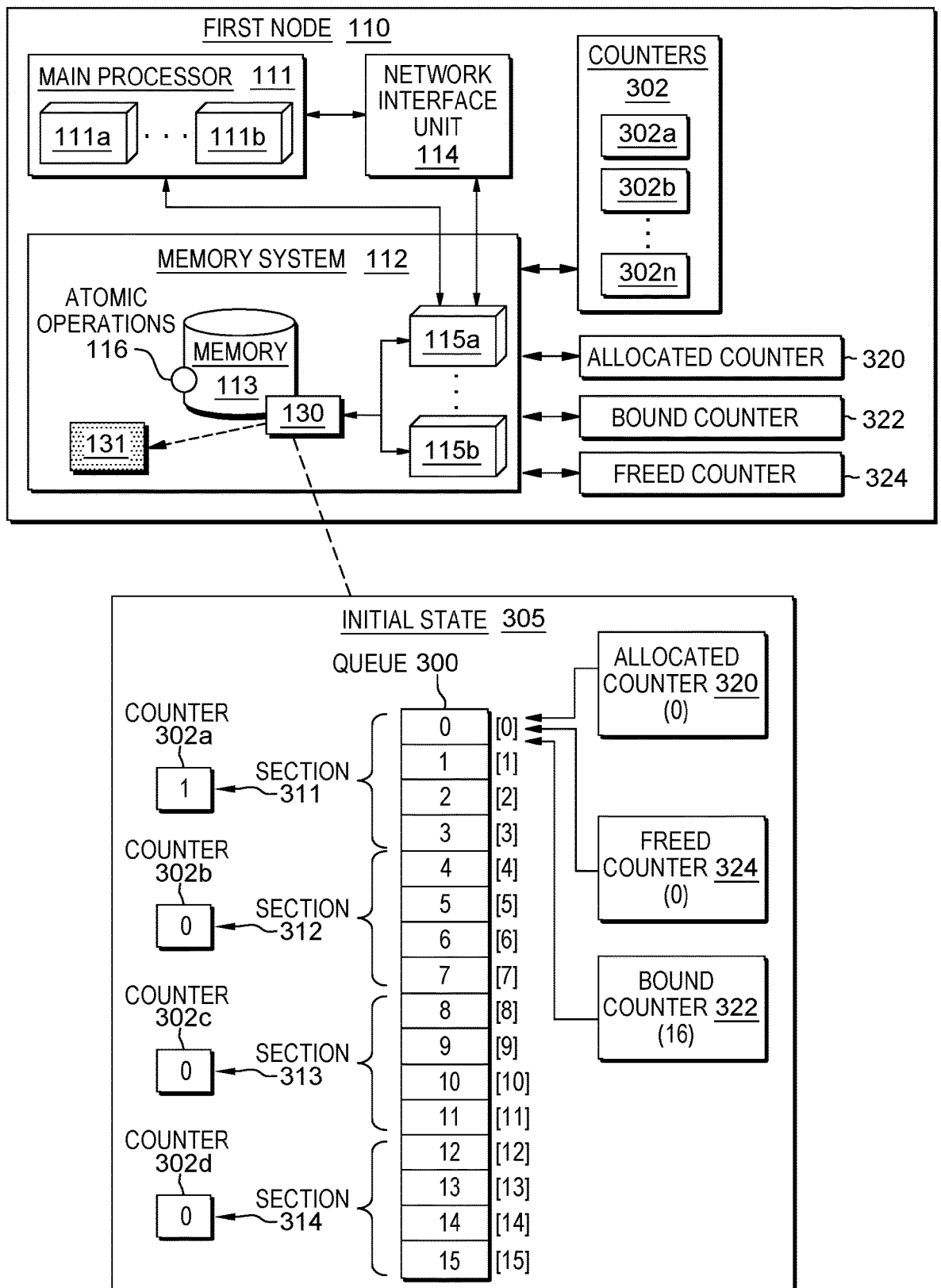
FIG. 3 illustrates the example system of FIG. 1 with additional details relating to reliability processing of remote direct memory access.

FIG. 3 illustrates the example system of FIG. 1 with additional details relating to reliability processing of remote direct memory access, arranged in accordance with at least some embodiments described herein. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

In an example, data structure 130 may be a parallel accessible "first in, first out" (FIFO) data structure. When data structure 130 is a FIFO data structure, processing elements 115 may access a plurality of hardware components among first node 110 to manage, modify, and/or perform particular operations on data among data structure 130. In an example shown in FIG. 3, first node 110 may further include one or more counters 302 (including counters 302a, 302b, 302c, 302d, etc.), an allocated counter 320, a bound counter 322, and/or a freed counter 324. As will be described in more detail below, processing elements 115 may modify values of counters 302, allocated counter 320, bound counter 322, and/or freed counter 324 based on allocations of sequence numbers to message, responses received by processing elements 115, and based on modifications of sequence numbers status.

In an example, data structure 130 may include a queue 300 that may be configured to collect one or more sequence numbers of inactive status. Active sequence numbers may be excluded from queue 300. When an inactive sequence number among queue 300 is allocated to a message, processing elements 115 may remove (or "pop") the allocated sequence number from queue 300 to set a status of the allocated sequence number to an active status. When a response is received from a destination node, acknowledging successful receipt of a message, processing elements 115 may free the corresponding sequence number by inserting (or writing, "push", etc.) the corresponding sequence number back into queue 300 to set a status of the corresponding sequence number to an inactive status.

An example initial state 305 of queue 300 of data structure 130 is shown in FIG. 3. In the example, queue 300 may include 16 slots, ranging from slot [0] to slot [15], where slots [0] to [15] includes sequence numbers 0 to 15, respectively. A presence of sequence numbers 0 to 15 in queue 300 may indicate that sequence numbers 0 to 15 are inactive, and are available for allocation.

At initial state 305, a value stored in allocated counter 320 may be initialized to '0' to set a first pointer at slot [0], and to indicate that no sequence numbers are allocated to any messages. A value of bound counter 322 may be initialized to '16' to set a second pointer at slot [0], and to indicate an upper bound of the pointer stored in allocated counter 320. In other words, bound counter 322, minus 1, may indicate a last available sequence number for allocation is located in slot [15] (16 minus 1). A value of freed counter 324 may be initialized to '0' to set a third pointer at slot [0], and to indicate that no sequence number is freed, where a freed sequence number may be a sequence number that was allocated to a message at least once and is inserted back into queue 300 upon a successful transmission of the message.

Queue 300 may be partitioned into a plurality of sections. In the example shown in FIG. 3, queue 300 may be partitioned into sections 311, 312, 313, 314, where each section may include four slots. Each section of queue 300 may be assigned to a counter among counters 302. For example, sections 311, 312, 313, 314 may be assigned to counters 302a, 302b, 320c, 320d, respectively. Each counter 302 may be used for judging that (1) the four slots in this section are filled with freed sequence numbers, and (2) the bound counter 322 has reached to the head of this section. When both conditions (1) and (2) are met, bound counter 322 may be moved to the next section (i.e. added by four) so that the four freed sequence numbers in this section may be allocated again. To judge the condition (1), each counter 302 may be configured to track a number of freed sequence numbers within an assigned section. Furthermore, to judge condition (2), each counter 302 may be configured to be incremented every time bound counter 322 reaches the head of this section. On the first lap, when both of the conditions are met, a counter 302 reaches the value 5 (added by 4 for condition (1), and added by 1 for condition (2)). Therefore, on a first lap, readiness of a section can be judged by comparing a counter 302 with the goal value '5'. In a second lap, a counter 302 can be compared with '10' ('5×2', or two times the goal value of '5'). In general, in each N-th lap, a counter 302 can be compared with the goal value of 5×N (lap number multiply by goal value of '5'). A value of a counter assigned to a first section among queue 300 (e.g., counter 302a) may be initialized to '1' in order to indicate the bound counter 332 is already pointing to the head of this section. As will described in more detail below, processing elements 115 may monitor the values of counters 302 to determine whether to update the pointer stored in bound counter 322 in order to update sequence numbers that may be available for allocation.

Figure 4:
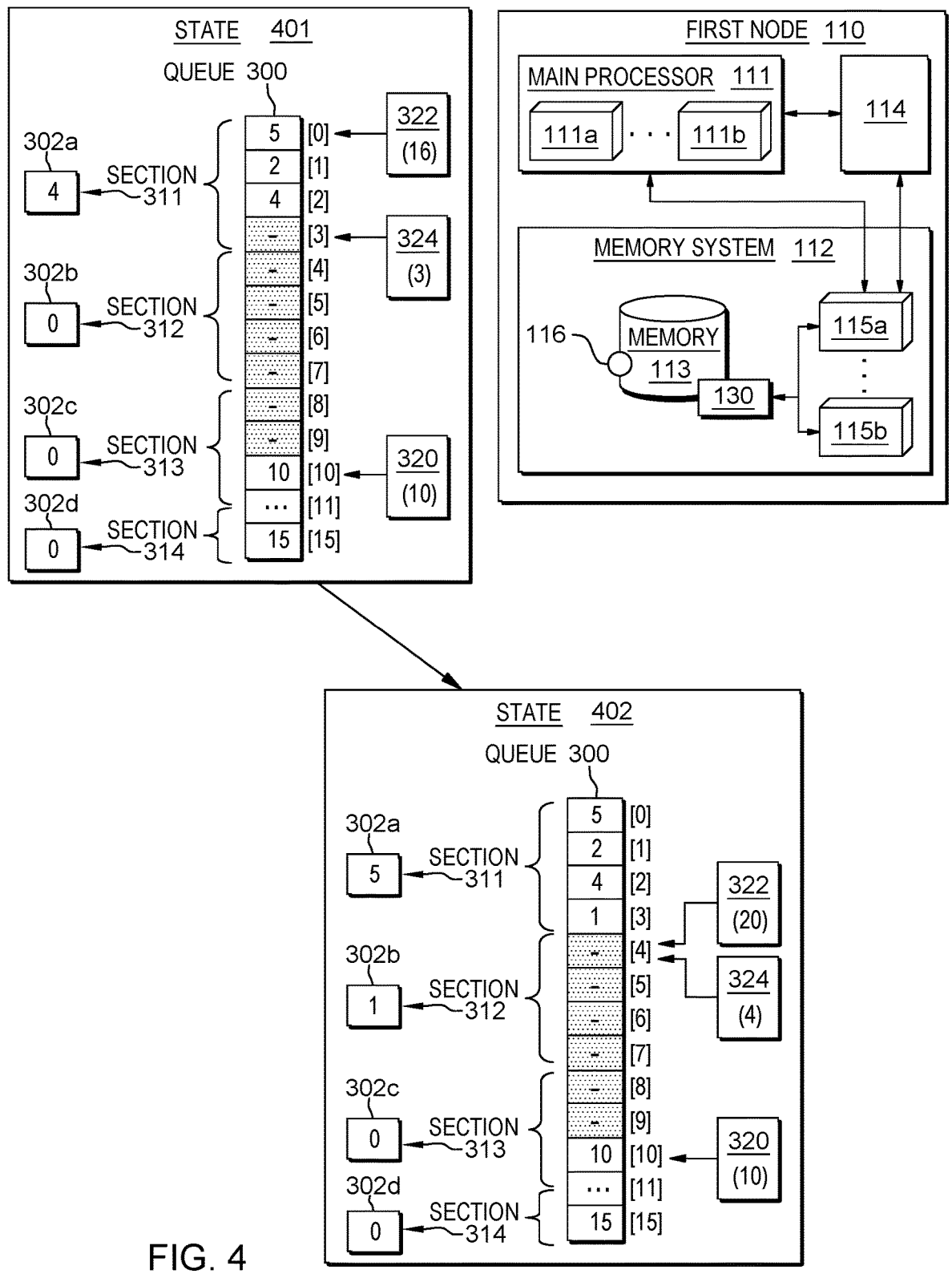
FIG. 4 illustrates the example system of FIG. 1 with additional details relating to reliability processing of remote direct memory access.

FIG. 4 illustrates the example system of FIG. 1 with additional details relating to reliability processing of remote direct memory access, arranged in accordance with at least some embodiments described herein. FIG. 4 is substantially similar to computer system 100 of FIGS. 1-3, with additional details. Those components in FIG. 4 that are labeled identically to components of FIGS. 1-3 will not be described again for the purposes of clarity.

In an example shown in FIG. 4, a state 401, followed by a state 402, illustrates an example embodiment in which a set of sequence numbers are allocated to messages, and a subset of the set of allocated sequence numbers are inserted back into queue 300 upon successful transmission of corresponding messages. Further, in the example, processing elements 115 may modify queue 300, counters 302, and pointers stored in allocated counter 320, bound counter 322, and freed counter 324, in response to allocations and/or insertions of sequence numbers.

At state 401, processing elements 115 may allocate ten sequence numbers (sequence numbers '0' to '9') to ten messages. Allocation of sequence numbers '0' to '9' may include removing sequence numbers '0' to '9' from slots [0] to [9] of queue 300. Upon a removal of sequence numbers '0' to '9' from slots [0] to [9], processing elements 115 may write the value '10' to allocated counter 320 to set a pointer at slot [10], which may indicate that ten sequence numbers are allocated. Further, upon a removal of sequence numbers '0' to '9' from slots [0] to [9], slots [0] to [9] may be available for insertion of sequence numbers corresponding to successfully transmitted messages (e.g., as shown by the shaded slots among queue 300 of FIG. 4).

Insertion of sequence numbers back into queue 300 may be performed in an order of the slot number of queue 300. In the example, sequence number '5' was first inserted into slot [0] to indicate that a message allocated with sequence number '5' was successfully transmitted, and that sequence number '5' is now inactive and may be available for allocation to another message. Sequence number '2', and then '4', were subsequently inserted into slots [1] and [2], respectively, following the insertion of sequence number '5' in slot [0].

In response to each insertion of a sequence number in queue 300, processing elements 115 may update, or increment, a counter assigned to a section including the slot with the inserted sequence number. For example, when sequence number '5' is inserted into slot [0], processing elements 115 may increment counter 302a, which is assigned to section 311 that includes slot [0], by '1'. Upon insertion of three sequence numbers '5', '2', '4', counter 302a may be incremented three times (from initial value of '1', shown in FIG. 3) to reach a value of '4'.

Further, in response to each insertion of a sequence number in queue 300, processing elements 115 may update, or increment, the value stored in freed counter 324 in order to update a pointer to point to a next available slot for insertion of a next sequence number. For example, when sequence number '5' is inserted into slot [0], processing elements 115 may write '1' to freed counter 324 to indicate that one sequence number has been freed and inserted into queue 300. Upon insertion of three sequence numbers '5', '2', '4', freed counter 324 may store a value '3' to indicate that three sequence numbers have been freed.

In a next state 402, sequence number '1' may be freed and inserted into slot [3] of queue 300. Upon insertion of sequence number '1' into slot [3], processing elements 115 may increment counter 302a to '5', and may write a value of '4' to freed counter 324. Processing elements 115 may compare counter 302a, which indicates a value of '5', with the counter goal value of '5' (number of slots in the section, plus 1) for the first lap. In the example shown in FIG. 4, the counter value matches the goal value of 5. This comparison may indicate that a section assigned to the counter may be fully freed, or may be fully filled with freed sequence numbers that may be reused. Further, processing elements 115 may increment a next counter, such as counter 302b, by a value of '1' in order to indicate that the bound counter 322 is now being moved to the head of the section 312, meaning that the section 312 will become ready for allocation as soon as the four slots [4] to [7] are filled with new freed sequence numbers.

In response to counter 302a meeting the first-lap goal value '5', processing elements 115 may update a value stored in bound counter 322 to '20', to point to the new upper bound for allocated counter 320. In other words, 4 additional sequence numbers stored in slots 0 to 3 are now available for allocation from queue 300. In the example, since the value stored in bound counter exceeds a total number of slots of queue 300, processing elements 115 may determine the location indicated by bound counter 322 by performing an operation, such as a modulus operation, to determine the location. For example, processing elements 115 may determine that '20 modulus 16' (bound counter value modulus total number of slots among queue 300) is '4', to determine that bound counter 322 is pointing to slot [4] of queue 300, which is next to the slot [3] where the last available sequence number is stored. By updating bound counter 322 in response to detection of a section being freed, queue slots can be safely filled by multiple processing elements 115 in parallel, without using a mutex/lock mechanism. Thus, all the operations may finish with bounded number of steps of operations.

Figure 5:
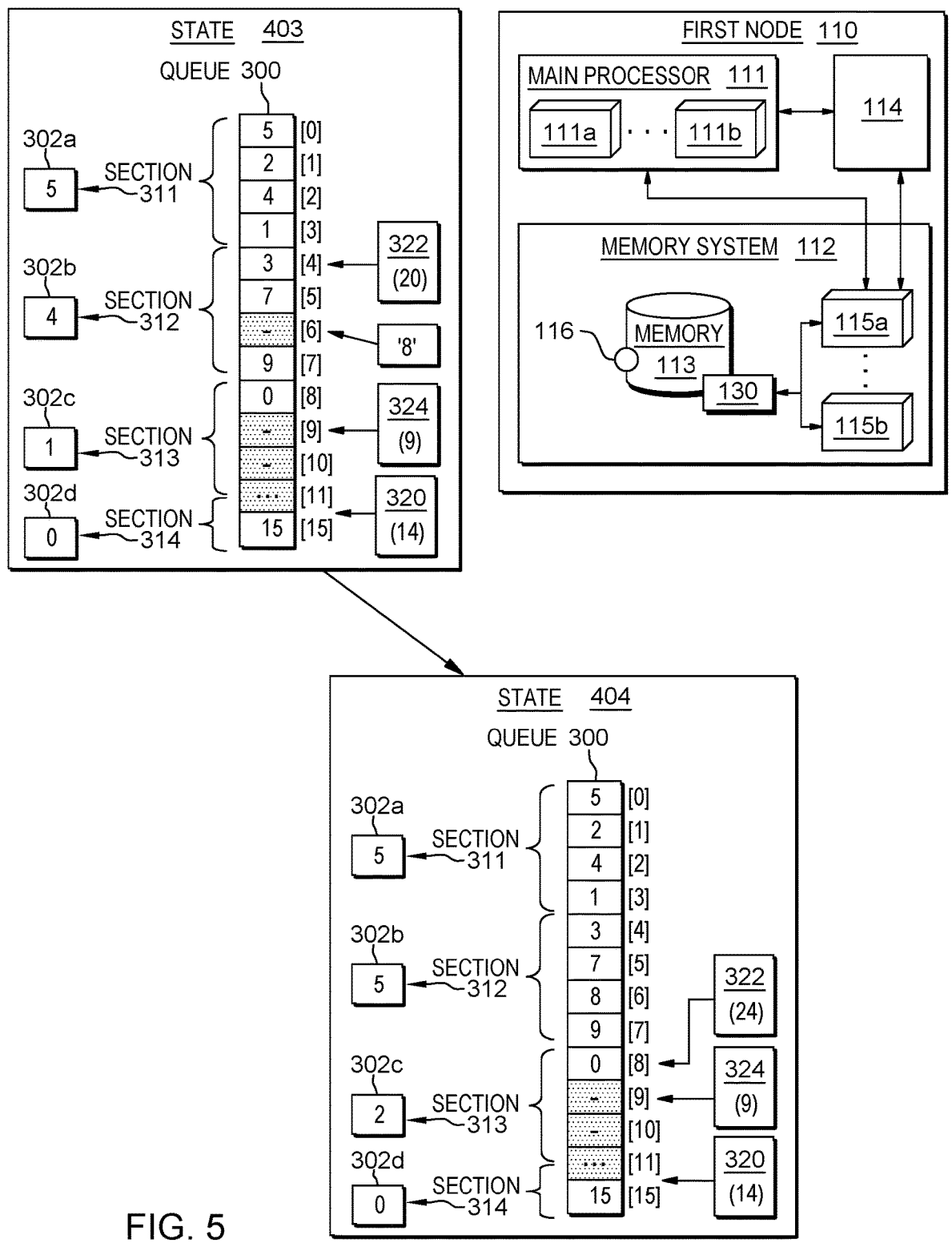
FIG. 5 illustrates the example system of FIG. 1 with additional details relating to reliability processing of remote direct memory access.

FIG. 5 illustrates the example system of FIG. 1 with additional details relating to reliability processing of remote direct memory access, arranged in accordance with at least some embodiments described herein. FIG. 5 is substantially similar to computer system 100 of FIGS. 1-4, with additional details. Those components in FIG. 5 that are labeled identically to components of FIGS. 1-4 will not be described again for the purposes of clarity.

In an example shown in FIG. 5, a state 403, followed by a state 404, illustrates an example embodiment in which a set of sequence numbers are allocated to messages, and a subset of the set of allocated sequence numbers are inserted back into queue 300 upon successful transmission of corresponding messages, but due to a delay of one of the insertions, an update to bound counter 322 may be delayed as well.

At state 403, processing elements 115 may further insert sequence numbers '3', '7', '8', '9', '0' into slots [4], [5], [6], [7], [8]. A delay of insertion of sequence number '8' may occur and thus, sequence number '8' may not be inserted at state 403. Since sequence number '8' was not inserted, a value of counter 302b may be incremented to '4', which does not reach the goal value '5' for the first lap (described above). Therefore, processing elements 115 may continue the implementation of system 100 without an update to bound counter 322, and a pointer in bound counter 322 may remain as '20' (same as state 402 shown in FIG. 4). Further, since sequence number '0' was successfully inserted into slot [8], counter 302c may be incremented to '1' and a pointer in freed counter 324 may be updated to '9' to indicate that a next available slot for insertion is slot [9].

At state 404, processing elements 115 may complete the insertion of sequence number '8' into slot [6]. As a result of inserting sequence number '8' into slot [6], counter 302b may be incremented to '5', which reaches the goal value for the first lap. Processing elements 115 may determine that counter 302b reached the goal value of 5 and, in response, may update the pointer in bound counter 322 to '24', where '(24−1) modulus 16' is '7', to indicate that the last available sequence number is in slot [7]. Further, in response to the bound counter 322 reaching the head of the section 313, counter 302c may be incremented to '2'.

FIG. 6 illustrates example sets of instructions that may be executed to implement the example system of FIG. 1, arranged in accordance with at least some embodiments described herein. Instructions 601 may be executed by processing elements 115 (described above in FIG. 1) to initialize and define a FIFO data structure (described above in FIGS. 3-5). Instructions 602 may be executed by processing elements 115 to allocate a sequence number as described above in FIGS. 3-5.

Focusing on instructions 601, line 1 of instructions 601 may be executed by processing elements 115 to define a number of sequence numbers that may be allocated by processing elements 115. In the example shown in FIG. 6, '4096' sequence numbers are defined.

Line 2 of instructions 601 may be executed by processing elements 115 to define a number of sections of queue 300 (described above in FIGS. 3-5). In the example shown in FIG. 6, '64' sections are defined.

Line 5 of instructions 601 may be executed by processing elements 115 to define a number of sequence numbers and/or slots in each section among queue 300. In the example shown in FIG. 6, '64' sequence numbers and/or slots are defined by dividing the defined number of sequence numbers by the defined number of queue sections.

Line 7 of instructions 601 may be executed by processing elements 115 to initialize the allocated counter 320 to '0'. Line 10 of instructions 601 may be executed by processing elements 115 to initialize the bound counter 322 (described above in FIGS. 3-5). In the example shown in FIG. 6, the bound counter 322 is initialized to '4096', which is the defined number of sequence numbers.

Line 13 of instructions 601 may be executed by processing elements 115 to initialize the freed counter 324 (described above in FIGS. 3-5) to '0'.

Lines 15-16 of instructions 601 may be executed by processing elements 115 to initialize the slots of queue 300 with sequence numbers 0 to 4095.

Line 21 of instructions 601 may be executed by processing elements 115 to initialize a first section counter (counter 302a described above) to '1', and initialized subsequent section counters 302 (described in FIGS. 3-5) to '0'.

Focusing on instructions 602, line 4 of instructions 602 may be executed by processing elements 115 to atomically fetch a unique queue slot ID in which an available sequence number is stored. The fetch_inc_bounded is an atomic operation that operates on the allocated counter 320 (n_allocated) and the bound counter 322 (n_alloc_bound). If the allocated counter 320 differs from the bound counter 322 (i.e. allocated counter has not reached the upper bound yet), the fetch_inc_bounded will return the current value of the allocated counter 320, and then increment the allocated counter by 1 to point to the next queue slot. On the other hand, if the allocated counter equals the bound counter (i.e. reached the upper bound), the allocated counter will not be incremented, and a special reserved value INC_FAILED is returned. These fetch and increment steps on the allocated counter 320 is performed atomically without being interrupted by another fetch_inc_bounded operation executed by another processing element. Therefore, each processing element retrieves a unique queue slot ID.

Lines 6-7 of instructions 602 may be executed by processing elements 115 to determine that when a search for a sequence number reaches a bound defined by bound pointer 312, processing elements 115 may return a special value to indicate that no sequence numbers are available. In such cases, allocation may be retried later.

Line 10 of instructions 602 may be executed by processing elements 115 to determine the physical position in the queue where the available sequence number is stored, by performing a modulus operation.

Line 12 of instructions 602 may be executed by processing elements 115 to return the fetched sequence number.

FIG. 7 illustrates an example set of instructions that may be executed to implement the example system of FIG. 1, arranged in accordance with at least some embodiments described herein. Instructions 701 may be executed by processing elements 115 (described above in FIG. 1) to free, or to insert used sequence numbers, into a FIFO data structure (described above in FIGS. 3-5). When a response is received from a destination node of a transmission of a message, the sequence number that was allocated to the message may need to be deallocated by being inserted back into queue 300 (described above in FIGS. 3-5) so that the sequence number may be reused by another message at a subsequent instance.

Line 4 of instructions 701 may be executed by processing elements 115 to retrieve a unique queue slot ID in which the freed sequence number is stored. The fetch_inc is an atomic operation that returns the current value of the freed counter 324 (n_freed), and then increments the freed counter by 1. These fetch and increment steps are performed atomically without being interrupted by another fetch_inc operation executed by another processing element. Therefore, each processing element retrieves a unique queue slot ID to store the freed sequence number.

Line 6 of instructions 701 may be executed by processing elements 115 to determine the physical position in queue 300 to insert the freed sequence number (seq_no), by performing a modulus operation.

Line 8 of instructions 701 may be executed by processing elements 115 to store the freed sequence number into the queue slot determined at line 6.

Line 11 of instructions 701 may be executed by processing elements 115 to determine the section (e.g., sections 311, 312, 313, 314 described in FIG. 3-5) in which the freed sequence number has been stored in Line 8. Note that this section ID does not wrap around when the freed counter 324 reaches the end of the queue. Therefore, a modulus operation by 64 is needed in this case to retrieve the actual section ID in the queue.

Lines 14 to 34 of instructions 701 may be executed by processing elements 115 to increment counters 302 (described in FIGS. 3-5 above) and to update bound counter 322 based on comparison of counters 302 with goal values (described in FIGS. 3-5 above). Line 17 may be executed by processing elements 115 to retrieve the physical section ID within the queue, by performing a modulus operation by N_QUEUE_SECTIONS. Line 19 may be executed by the processing elements 115 to identify number of times the bound counter lapped the queue. Line 22 may be executed by processing elements 115 to retrieve the current value of the target section counter 302 and then increment the counter by 1. The fetch_inc atomic operation performs these fetch and increment steps in atomic manner without being interrupted by another processing element. Line 26 of instructions 701 may be executed by processing elements 115 to determine the goal value of the section counter, considering the number of slots in each section and number of times the bound counter lapped the queue. The goal value is subtracted by 1 for adjustment. This adjustment is required because the fetch_inc operation on Line 22 returns the value of the section counter before the increment. i.e. the value stored in_freed_count_in_section is off by 1 from the current value of the section counter. Line 29 of instructions 701 may be executed by processing elements 115 to compare a counter with the goal value calculated in Line 26 in order to determine whether a corresponding section is totally freed and ready for allocation. Lines 32-33 may be executed by processing elements 115 to move to a next section in response to a current section being freed, and update bound counter 322 in response to the current section being freed. Lines 14 to 34 may be repeated until there is a section that is not ready to be freed yet.

A system in accordance with the present disclosure may offload remote direct memory access (RDMA) reliability processing to processing elements that are different from a main processor in a computing node. The processing elements may be configured to perform memory operations on a data structure stored in a memory of the computing node, such that there may be no need for the main processor to perform operations relating to reliability processing. As such, the system in accordance with the present disclosure may eliminate central processing unit (CPU) overhead for reliability processing. Further, the processing elements may manage a data structure stored in a memory location shared by the processing elements, such that it may be unnecessary to duplicate the data structure for each CPU core or thread in a multi-core architecture to improve scalability. The utilization of a centralized data structure to track messages may provide an improvement over embodiments where multiple CPUs use various memory atomic operations for tracking purposes.

Figure 8:
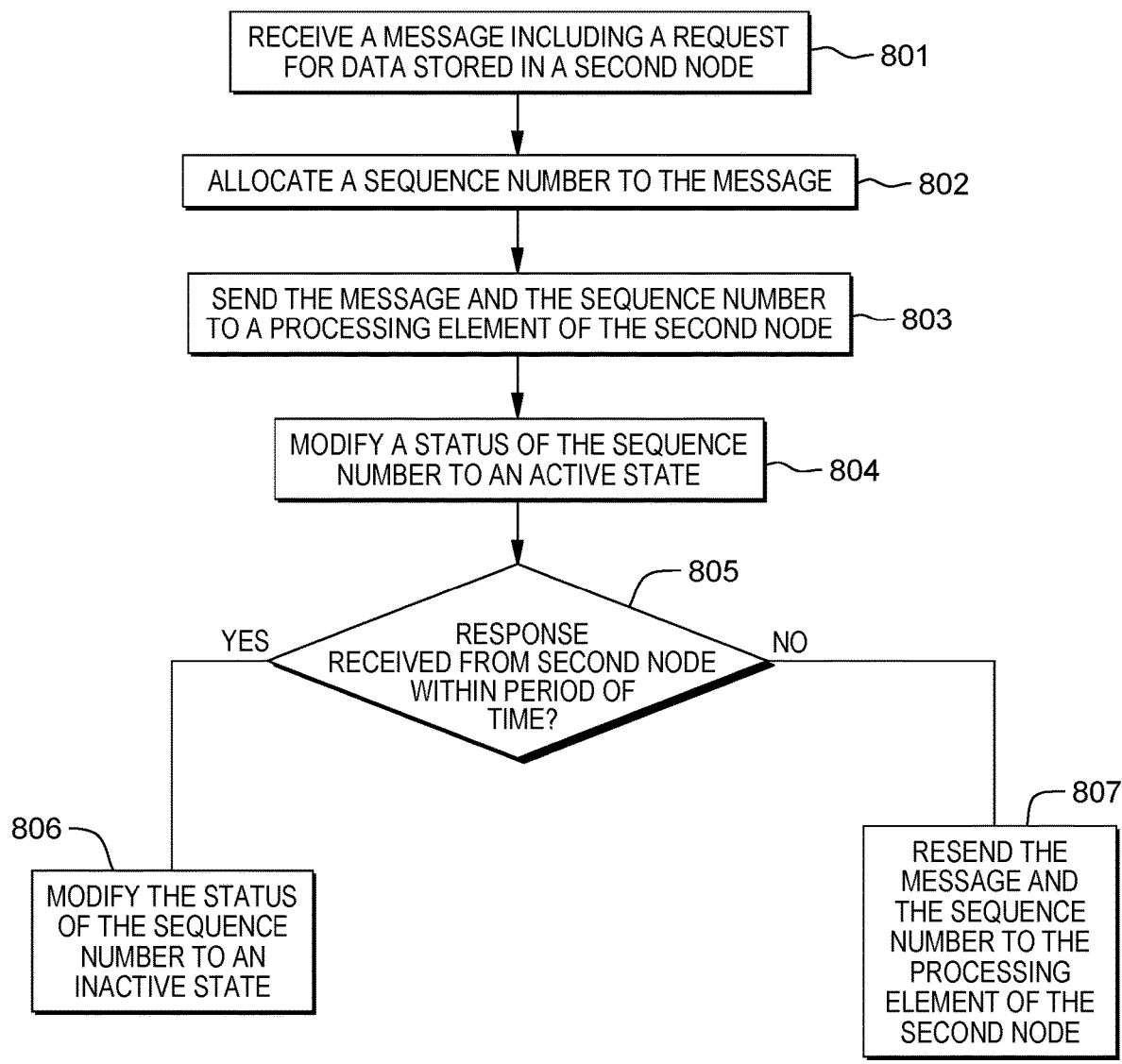
FIG. 8 illustrates a flow diagram for an example process to implement reliability processing of remote direct memory access.

FIG. 8 illustrates a flow diagram for an example process to implement reliability processing of remote direct memory access, arranged in accordance with at least some embodiments presented herein. The process in FIG. 8 could be implemented using, for example, computer system 100 discussed above. An example process may include one or more operations, actions, or functions as illustrated by one or more of blocks 801, 802, 803, 804, 805, 806, and/or 807. Although illustrated as discrete blocks, various blocks may be divided into additional blocks, combined into fewer blocks, eliminated, or performed in parallel, depending on the desired implementation.

Processing may begin at block 801, where a processing element of a first node may receive a request to send a message including a request to perform an access operation, such as reading and/or updating, on data stored in a second node. The first node may include one or more main processors different from the processing element.

Processing may continue from block 801 to block 802. At block 802, the processing element may allocate a sequence number to the message.

Processing may continue from block 802 to block 803. At block 803, the processing element of the first node may send the message and the sequence number to a processing element of the second node.

Processing may continue from block 803 to block 804. At block 804, the processing element may modify a status of the sequence number to an active state. The active state of the sequence number may indicate that a transmission of the message is pending.

Processing may continue from block 804 to block 805. At block 805, the processing element may identify a presence or an absence of a response from the second node within a period of time.

In response to a presence of a response from the second node, processing may continue from block 805 to block 806. At block 806, the processing element may modify the status of the sequence number to an inactive state. The inactive state of the sequence number may indicate that a transmission of the message is completed.

In response to an absence of a response from the second node, processing may continue from block 805 to block 807. At block 807, the processing element of the first node may resend the message and the sequence number to the processing element of the second node.

Figure 9:
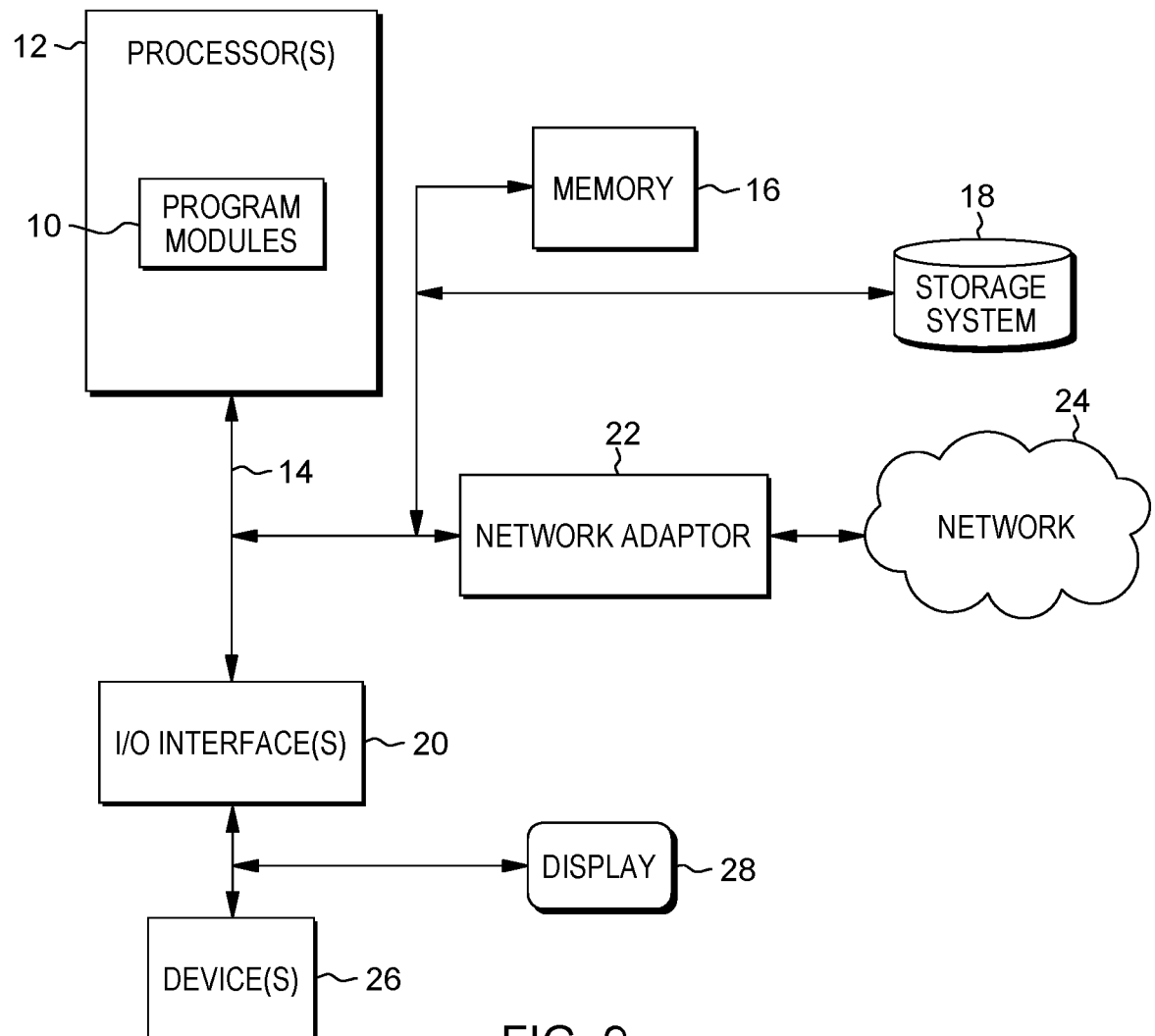
FIG. 9 is an exemplary block diagram of a computer system in which processes involved in the system, method, and computer program product described herein may be implemented.

FIG. 9 illustrates a schematic of an example computer or processing system that may implement any portion of computer system 100, first node 110, main processing 111, processing elements 115, second node 120, main processor 121, processing elements 125, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring remote transmissions of messages among a plurality of nodes, the method comprising:

receiving, by a processing element in a first node, a request to send a message to perform an access operation on data stored in a second node, wherein the first node includes one or more main processors different from the processing element;

identifying, by the processing element, a first bit from a first level of a data structure, wherein the first bit is indicative of an available sequence number;

identifying, by the processing element, a second bit in a second level of the data structure, wherein the second bit is indicative of an inactive state of the available sequence number;

allocating, by the processing element, the available sequence number having the inactive state as a sequence number to the message, wherein a status of the sequence number indicates a transmission status of the message;

sending, by the processing element, the message and the sequence number to a processing element of the second node;

modifying, by the processing element, the status of the sequence number to an active state, wherein the active state of the sequence number indicates that a transmission of the message is pending;

identifying, by the processing element, a presence or an absence of a response from the second node within a period of time;

wherein:
in response to a presence of the response from the second node within the period of time, modifying, by the processing element, the status of the sequence number to an inactive state, wherein the inactive state of the sequence number indicates that a transmission of the message is completed; and in response to an absence of the response from the second node within the period of time, resending, by the processing element, the message and the sequence number to the processing element of the second node.

2. The method of claim 1, wherein:
the first bit includes a value representative of the available sequence number, the first bit is among a first bit vector in the first level of the data structure, and the data structure includes a plurality of levels comprising at least the first level and the second level;

the method further comprising:
identifying, by the processing element, a second bit vector associated with the first bit, wherein the second bit vector is among a plurality of bit vectors in the second level of the data structure, and the second bit is among the second bit vector; and identifying, by the processing element, the available sequence number as the sequence number to the message based on the first bit and the second bit.

3. The method of claim 2, wherein modifying the status of the sequence number includes modifying the value of the second bit.

4. The method of claim 1, further comprising:
prior to allocating the sequence number to the message, identifying, by the processing element, the sequence number in a queue; and
removing, by the processing element, the sequence number from the queue in response to allocating the sequence number to the message.

5. The method of claim 4, wherein:
modifying the status of the sequence number to the active state includes removing the sequence number from a first slot the queue; and
modifying the status of the sequence number to the inactive state includes inserting the sequence number into a second slot of the queue.

6. The method of claim 5, wherein a location of the first slot is indicated by a first pointer stored in a first counter of the first node, and a location of the second slot is indicated by a second pointer stored in a second counter of the first node, and the method further includes:
updating, by the processing element, the first pointer in response to the removal of the sequence number from the first slot of the queue; and
updating, by the processing element, the second pointer in response to the insertion of the sequence number into the second slot of the queue.

7. The method of claim 1, further comprising, in response to the absence of the response from the second node within the period of time, resending, by the processing element, a plurality of messages associated with a plurality of sequence numbers in the inactive state.

8. The method of claim 1, wherein the processing element is a first processing element, the first node includes a second processing element, the sequence number is stored in a data structure, and the data structure is accessible by the first and second processing elements, wherein the first processing element and the second processing element are configured to modify status of sequence numbers stored in the data structure concurrently without using a mutual exclusive lock.

9. A system effective to monitor remote transmissions of messages among a plurality of nodes, the system comprises:
a first node including at least a first main processor, a first memory, and a first processing element different from the first main processor;
a second node including at least a second main processor, a second memory, and a second processing element different from the second main processor;
the first processing element is configured to:
receive a request to send a message to perform an access operation on data stored in the second memory of the second node;
identify a first bit from a first level of a data structure stored in the first memory, wherein the first bit is indicative of an available sequence number;
identify a second bit in a second level of the data structure, wherein the second bit is indicative of an inactive state of the available sequence number;
allocate the available sequence number having the inactive state as a sequence number to the message, wherein a status of the sequence number indicates a transmission status of the message;
send the message and the sequence number to the second processing element of the second node;
modify the status of the sequence number to an active state, wherein the active state of the sequence number indicates that a transmission of the message is pending;
identify a presence or an absence of a response from the second processing element within a period of time;
wherein:
in response to a presence of the response from the second processing element within the period of time, modify the status of the sequence number to an inactive state, wherein the inactive state of the sequence number indicates that a transmission of the message is completed; and
in response to an absence of the response from the second node within the period of time, resend the message and the sequence number to the second processing element of the second node.

10. The system of claim 9, wherein the second processing element of the second node is configured to:
receive the message and the sequence number;
in response to the receipt of the message and the sequence number, send the response to the first processing element of the first node.

11. The system of claim 9, wherein:
the first bit includes a value representative of the available sequence number, the first bit is among a first bit vector in the first level of the data structure, and the data structure includes a plurality of levels comprising at least the first level and the second level;
the first processing element is further configured to:
identify a second bit vector associated with the first bit, wherein the second bit vector is among a plurality of bit vectors in the second level of the data structure and the second bit is among the second bit vector; and
identify the available sequence number as the sequence number based on the first bit and the second bit.

12. The system of claim 11, wherein the first processing element is further configured to modify the value of the second bit in order to modify the status of the sequence number.

13. The system of claim 9, wherein the first memory is configured to store a data structure, and the first processing element is further configured to:
identify the sequence number in a queue of the data structure; and
remove the sequence number from the queue in response to allocation of the sequence number to the message.

14. The system of claim 13, wherein the first processing element is further configured to:
remove the sequence number from a first slot the queue to modify the status of the sequence number to the active state; and
insert the sequence number into a second slot of the queue to modify the status of the sequence number to the inactive state.

15. The system of claim 14, wherein the first node further includes:
a first counter configured to store a first pointer indicative of a location of the first slot;
a second counter configured to store a second pointer indicative of a location of the second slot, and the first processing element is further configured to:
update the first pointer in response to the removal of the sequence number from the first slot of the queue; and
update the second pointer in response to the insertion of the sequence number into the second slot of the queue.

16. The system of claim 9, wherein the first processing element is further configured to, in response to the absence of the response from the second node within the period of time, resend a plurality of messages associated with a plurality of sequence numbers in the inactive state.

17. The system of claim 9, wherein the first node further includes a third processing element, the sequence number is stored in a data structure, the data structure is accessible by the first and third processing elements, and wherein the first processing element and the third processing element are configured to modify status of sequence numbers stored in the data structure concurrently without using a mutual exclusive lock.

18. A computer program product for monitoring remote transmissions of messages among a plurality of nodes, the computer program product comprising a computer readable storage medium having program instructions embodied therewith, the program instructions executable by a processing element of a device to cause the device to:
receive a request to send a message to perform an access operation on data stored in a destination node, and wherein the device includes one or more main processors different from the processing element;
identify a first bit from a first level of a data structure, wherein the first bit is indicative of an available sequence number;
identify a second bit in a second level of the data structure, wherein the second bit is indicative of an inactive state of the available sequence number;
allocate the available sequence number having the inactive state as a sequence number to the message, wherein a status of the sequence number indicates a transmission status of the message;
send the message and the sequence number to a processing element of the destination node;
modify the status of the sequence number to an active state, wherein the active state of the sequence number indicates that a transmission of the message is pending;
identify a presence or an absence of a response from the destination node within a period of time;
wherein:
in response to a presence of the response from the destination node within the period of time, modify the status of the sequence number to an inactive state, wherein the inactive state of the sequence number indicates that a transmission of the message is completed; and in response to an absence of the response from the destination node within the period of time, resend the message and the sequence number to the processing element of the destination node.

19. The computer program product of claim 18, wherein:
the first bit includes a value representative of the available sequence number, the first bit is among a first bit vector in the first level of the data structure, and the data structure includes a plurality of levels comprising at least the first level and the second level;
the program instructions are further executable by the processing element of a device to:
identify a second bit vector associated with the first bit, wherein the second bit vector is among a plurality of bit vectors in the second level of the data structure, and the second bit is among the second bit vector; and
cause the device to identify the available sequence number as the sequence number to the message based on the first bit and the second bit, wherein the processing element is among a plurality of processing elements of the device, and the plurality of processing elements are configured to update the data structure concurrently without using a mutual exclusive lock.

20. The computer program product of claim 18, wherein the program instructions are further executable by the processing element of a device to cause the device to:
prior to allocation of the sequence number to the message, identify the sequence number in a queue;
in response to allocating the sequence number to the message, remove the sequence number from the queue to modify the status of the sequence number to the active state; and
in response to receipt of the response from the destination node, insert the sequence number into a second slot of the queue to modify the status of the sequence number to the inactive state, wherein the processing element is among a plurality of processing elements of the device, and the plurality of processing elements are configured to update the data structure concurrently without using a mutual exclusive lock.

* * * * *